Oct. 8, 1935.  W. G. LERCH  2,016,865
BEAD LAYING MECHANISM
Filed March 15, 1934
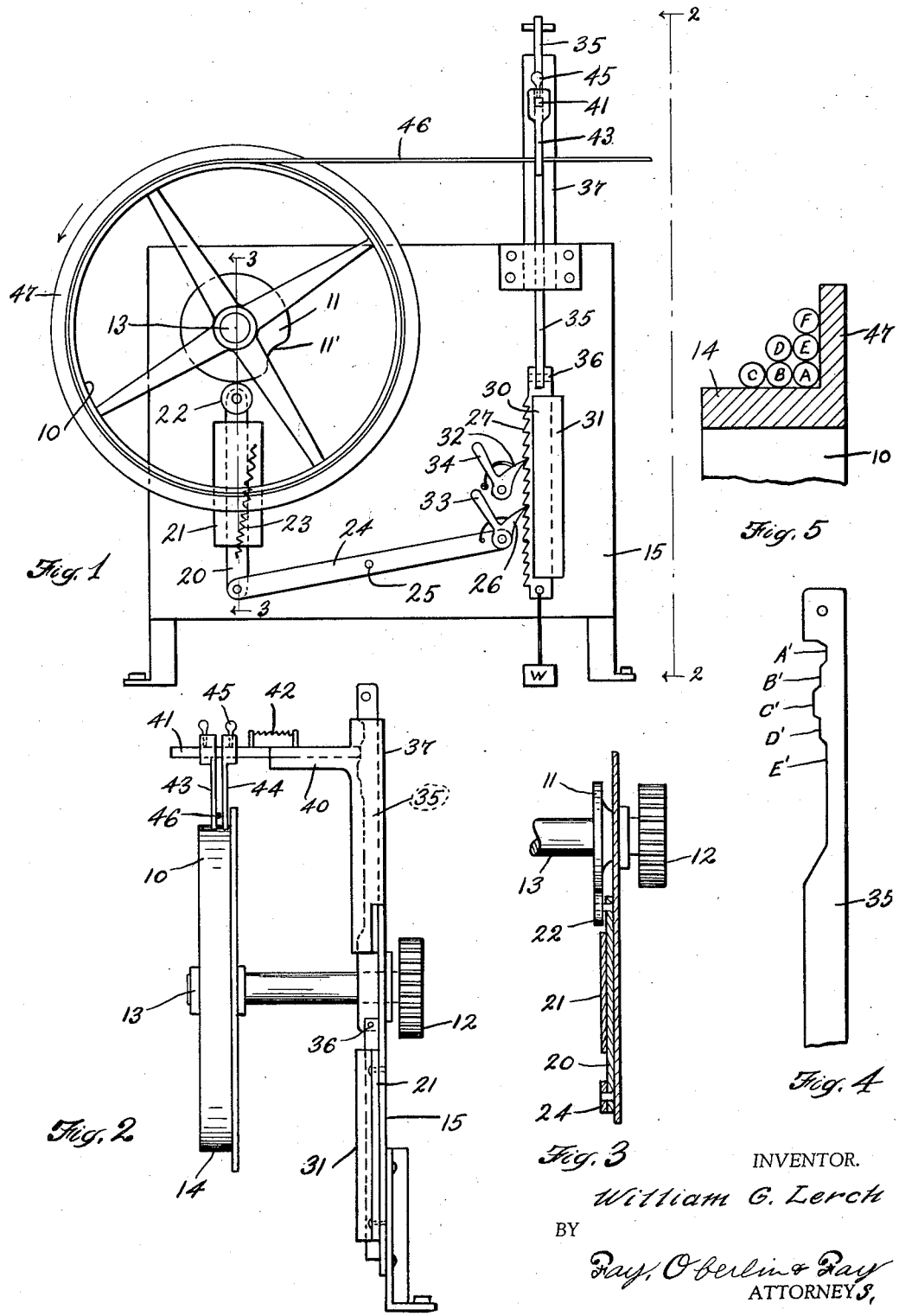
INVENTOR.
William G. Lerch
BY
Fay, Oberlin & Fay
ATTORNEYS, Patented Oct. 8, 1935

2,016,865

UNITED STATES PATENT OFFICE 2,016,865

BEAD LAYING MECHANISM

William G. Lerch, Akron, Ohio, assignor of one-half to Master Tire and Rubber Corporation, Akron, Ohio, a corporation of Delaware Application March 15, 1934, Serial No. 715,639

3 Claims. (Cl. 154—9)

This invention relates to a machine for laying up a wound article in a definite pattern of successive turns. The preferred embodiment herein is one particularly adapted to form what are called the "cable type" of tire beads, such as those beads which constitute the subject-matter of my U. S. Patents 1,943,272 to 1,943,275 inclusive.

My invention aims to provide a simple means whereby the successive turns of cable composing the bead can be wound in predetermined form by the action of mechanism coordinated with the wheel on which the bead is wound. A further purpose of the invention is to make a mechanism of this sort in which the wind can be changed within a considerable range by different settings of suitable parts of the machine and substitution of various cams.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In the accompanying drawing Fig. 1 is a front elevation of a machine embodying the principles of my invention; Fig. 2 is an elevation on the line 2—2 Fig. 1, the winding wheel being shown in section; Fig. 3 is a vertical section on the line 3—3 Fig. 1; Fig. 4 is a side elevation of a positioning cam; and Fig. 5 is a diagrammatic axial section view through the rim of the tire forming wheel, showing the order of laying.

Referring now particularly to Figs. 1 and 2, the reference character 10 indicates a wheel on which the tire bead is wound, this wheel corresponding to the wheel 30 of U. S. Patent No. 1,943,272. The wheel 10, a cam 11, and a pinion 12 are all fast on the same shaft 13. The cam 11, hereafter referred to as the lifting cam, operates a train of mechanism, all carried by a suitable frame, which varies the position in which the successive turns of the cable are laid on the rim 14 of the wheel 10 during the revolution of the wheel.

This mechanism may take any one of a variety of appropriate forms. The preferred embodiment here illustrated comprises a support generally indicated by the reference character 15. In this embodiment the principal part of the support is a large plate 15 attached to the floor, and suitably reinforced by any convenient details of arrangement (not shown). The shaft 13 passes through this plate and all the working elements with the exception of the drive pinion 12 are on that face of the plate which is toward the observer in Fig. 1.

A vertical bar 20 movable in a guide 21 which is secured to the surface of the plate 15 carries at its upper end a roller 22 travelling on the face of the cam 11 and held thereagainst by a coiled spring 23. The lower end of this bar 20 is pivoted to one end of a link 24, this link being fulcrumed at its mid-length as at 25 to the supporting plate 15. The opposite end of the link carries a pawl 26 engageable with any one of a series of teeth 27 on the exposed edge of another vertical bar 30. The bar 30 is movable lengthwise in a suitable guide 31 and is prevented from falling by a pawl 32 mounted on the plate 15. The pawl 26 is releasable, as by a handle 33, and the pawl 32 is releasable as by a handle 34. A weight W, suspended from the bottom of the bar 30, gives steadiness to the action and assists in lowering the bar 30 and the parts carried thereby when the machine is re-set to start a new bead.

A cam 35, called the positioning cam and consisting of a flat bar with suitable surfaces such as A' to E', Fig. 4, cut along the edge, is detachably connected as by the fork and pin 36 to the top of the bar 30 for movement therewith. This cam is guided within an upright 37, also secured to the plate 15.

Near the top of the upright 37, and rigid therewith, a horizontal arm 40 extends parallel with the shaft 13 and towards the wheel 10. One end of a horizontally movable slide 41 is held and guided within the arm 40, the other end projecting out beyond the plane of the wheel 10. A spring 42 is fastened to projections on the arm and on the slide, to hold the inner end of the slide against the edge of the positioning cam. Thus the inner end of the slide 41 is constantly held against the positioning cam surfaces such as A' to E' and is movable thereby. Fingers 43, 44 depend from the extending portion of the slide 41 and are clamped at any given position therealong by means of set screws such as 45. These fingers 43, 44 guide the cable 46 to its position on the rim of the wheel 10.

The wheel rim is preferably flanged on the inner side as best seen in Figs. 2 and 5, the flange being designated by the reference character 47. The wheel 10 is of conventional type and may be collapsible or otherwise equipped in the usual manner to permit withdrawal of the formed tire bead. It will be observed that the fingers 43, 44 constrain only the horizontal movement of the cable 47 and leave it free to move up and down through a range as great as the height of any structure which might be formed by winding.

In the particular example shown in Fig. 4, the upper end of the positioning cam 35 is formed with five successive surfaces A', B', C', D', E', at three different levels. For reasons which will appear in connection with the description of the operation, hereafter, the horizontal distance between any two surfaces, such as A' and B' is equal to the width of the cable 46 which is being laid, and the vertical distance between successive points on any of the surfaces, such, for example, as the lower corner of A' and the lower corner of B' is equal to the vertical distance between successive teeth 27 on the bar 30. That is, the lift of the positioning cam, and the wind illustrated herein, is equal to the cable diameter, and the pitch of the successive cam surfaces is equal to the tooth pitch. It will become apparent from the description of the operation, that the positioning of the successive turns is dependent upon the lift (that is, the horizontal distance between A' and B' for example), whereas the pitch of the successive cam surfaces is not definitely related to the diameter of the cable 46.

The operation will now be described with particular reference to Figs. 1, 4 and 5. The free end of the bead being suitably secured to the wheel 10 by conventional means not shown, the first turn A of the cable 47 is laid with the inner end of the slide 41 in contact with the face A' of the positioning cam 35. At the end of the revolution, a notch 11' on the cam 11 comes to the bottom and the rod 20 is accordingly pulled up by the spring 23. Thereby the pawl 26 is lowered from the position shown in Fig. 1 and takes hold beneath another tooth 27 of the bar 30. In the meantime the bar 30 has been held up by the upper pawl 32. As soon as the notch 11' passes the bottom position, the bar 20 is pushed down, raising the tooth 26 and thus raising the rod 30 one notch and with it the positioning cam 35 so that the cam face B' now engages the inner end of the bar 41, thus carrying fingers 43, 44 out a distance equal to the diameter of the cable 46. Thus the turn B is laid by the second revolution of the wheel 10. The next turn brings the cam 35 up one more tooth height, bringing the surface C' to bear against the end of 41 and moving the fingers out one bead width further, laying the turn C. The next upward step of the cam 35 brings the face D' into action, whereupon the spring 42 pulls the bar 41 with its fingers 43, 44 back one cable width and the turn D is laid.

Since there is no constraint on the rising of the cable 47, this turn is properly placed solely by the backward movement of the fingers, without the need of any special mechanism to cause it to ride upon the turn B. The next revolution and corresponding movement of the lever train brings the face E' into action and the turn E is laid. To avoid the need of any throw-off mechanism, the cam 35 is again raised a notch after the turn E is completed, with the result that the inner end of the slide 41 bears further down on the surface E' during the laying of the turn F than it did during the laying of the turn E. However, it will be observed that the vertical extent of face E' is equal at least to the vertical spacing of two teeth 27 and that the raising of the positioning cam 35 has no effect upon the slide 41 and its fingers. Also the surfaces A' and E', B' and D' are in the same plane.

It is apparent that any one of a variety of cams 35 may be used with variations in surfaces according to the lay desired.

The form of cam shown and illustrated is a simple one for a six cable bead, but it is to be understood that the principles of this mechanism are applicable to other purposes than the laying of tire beads and that by proper combinations of the faces of the cams 11 and 35, a wide variety of winds can be obtained.

It is ordinarily contemplated that the cam 11 will not be changed, although there is no reason why it cannot be changed if advisable under special circumstances. For this purpose the lifting cam 11 could be split or otherwise be made removable. The cam 35 is removed by pulling the pin at the joint 36, lifting the cam out of the guides 31 and substituting another. Variations in the relationships between the notches and dwells of the cam 11 and the teeth of the bar 30 can also be arranged. In the simplest form the depth of the notch 11' is equal to the pitch of the teeth.

It will be understood from the foregoing that I have invented a winding mechanism of general usefulness, although the particular application shown is that of laying a tire bead.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In winding apparatus, in combination a wheel whereon a strand is adapted to be wound, means for patterning the wind of said strand, said means comprising a guide movable parallel to the wheel axis and a cam movable parallel to a radial plane of the wheel for positioning said guide, said cam having a series of faces each horizontally spaced a distance related to the thickness of the strand, means for lifting said cam in relation to the revolutions of the wheel to bring successive cam faces into contact with said guide to position the same.

2. In a winding apparatus, in combination, a wheel having a rim whereon an article is adapted to be formed by winding, a slide movable transversely of said rim, means on said slide for strand guidance transversely of said rim, positioning means for said slide including a cam having a plurality of faces adapted to be brought into contiguity to said slide, and step-by-step means for bringing said faces into such contiguity in sequence related to the rotation of the wheel.

3. In a winding apparatus, in combination, a wheel having a flanged rim whereon an article is adapted to be formed by winding, a slide movable transversely of said rim, strand guiding fingers adjustable on said slide, positioning means for said slide including a longitudinally movable cam having a plurality of faces adapted to be brought into contiguity to said slide, a lever having means to lift said cam step-by-step, and a cam rotatable with said wheel and in actuating engagement with said lever.

WILLIAM G. LERCH.